United States Patent Office 3,466,455
Patented Sept. 9, 1969

3,466,455
CIRCUIT ARRANGEMENT AND METHOD FOR STABILISING THE CURRENT DISTRIBUTION IN PARALLEL-CONNECTED ELECTRONIC REGULATORS
Georg Hecht and Karl Sacher, Nuremberg, Germany, assignors to Felten & Guilleaume Fernmeldeanlagen G.m.b.H., Nuremberg, Germany, a German company
Filed Oct. 18, 1966, Ser. No. 587,565
Claims priority, application Germany, Dec. 14, 1965,
F 47,918
Int. Cl. H02j 1/10, 3/38
U.S. Cl. 307—53                          3 Claims

ABSTRACT OF THE DISCLOSURE

A system for providing a constant load current from parallel connected electronic regulators, each having an electronic valve connected in series with the load and serving as a variable resistor. The circuit utilizes a common resistor through which the current from both regulators pass, and two measuring resistors connected in the current paths between the two regulators and the common resistor. Each regulator is controlled by comparing a reference signal with a control signal generated across the combination of the common resistor and the measuring resistor associated with the regulator being controlled.

---

Figure 1:
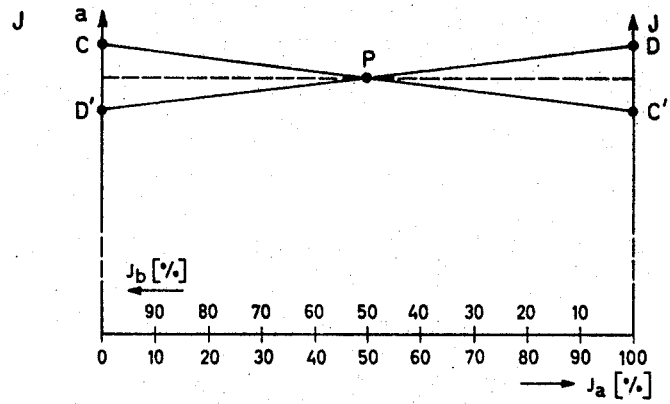

The present invention relates to a circuit arrangement and method for stabilising the current distribution in parallel-connected electronic current regulators comprising an electronic valve connected in series with the load and serving as a variable resistor, a reference means, and an amplifier.

Submarine amplifiers located in underwater cable installations are supplied with direct current from shore stations along the internal conductor of the coaxial underwater cable. In order to ensure the longest possible life for the electronic valves in the underwater amplifiers the supply current must be kept exceptionally constant. For this reason the DC regulators utilized in shore stations need to operate with a high degree of accuracy and reliability since if the supply of current fails, communications break down completely and the resulting cooling and reheating effects will reduce the life of the valves.

In order to ensure the necessary reliability it is customary, at shore stations, to utilize two parallel-connected regulators. During normal operation each of these two regulators supplies half of the current, and when one fails the other must be able to function reliably and supply continuously and automatically all the current required. The two regulators are identical, so that when one fails the other functions as an independent circuit at the point of parallel connection.

In order to ensure that when one regulator cuts out the other automatically supplies the full amount of current, the two regulator circuits must be connected together. A simple method requiring no additional components or devices which would reduce the overall reliability of the arrangement consists in providing a common measuring resistor but with separate reference means for the two regulator circuits. The reference means for the two regulator circuits are set to the nominal value of the current required, with each regulator supplying only half of the current. If one regulator fails, the other will automatically increase the supply of current until the amount of current flowing through the common measuring resistor again reaches the prescribed value.

This method has the disadvantage that the distribution of current between two such parallel-connected regulators is not stable. If the current in one rheostat fluctuates for one reason or another, the other regulator will vary its current in the opposite sense. The position of the working point would then be very unreliable. The stability of the current distribution in such a system decreases the more accurately the parallel-connected regulators operate and the smaller their p-errors are.

A regulator without a p-error would have a completely horizontal regulation characteristic, and it would be impossible to achieve a stable working point using two regulators in parallel. However, as a result of the p-error, the regulation characteristic of each regulator is more or less sloping, and the resultant point of intersection represents a momentarily stable working point. This working point is, however, continually being shifted under the influence of various disturbances, since each disturbance is able to effect a displacement of the regulation characteristics of the order of magnitude of the p-error and hence influences the overall slope.

A conventional method for stabilising the working point of two regulators in parallel consists in giving each regulator an accurately defined characteristic with a definite slope, so that the resultant point of intersection represents a stable working point.

FIGURE 1 of the accompanying drawing diagrammatically illustrates this situation. The nominal value of the current of regulator A is shown on the left-hand ordinate while the nominal value of the current of regulator B is shown on the right-hand ordinate, both on a considerably enlarged scale. On the abscissa is shown the percentage of the total current through the individual regulators, this value being shown from left to right in the case of regulator A, and from right to left in the case of regulator B. In order to ensure that when one of the regulators fails the deviation from the theoretical value of the input current to the submarine amplifier due to the inclination of the characteristics is kept to a minimum, the inclination of the characteristics must clearly be kept as small as possible.

Since the inclination of the characteristics must thus be kept exceptionally small, it is necessary for the natural inclination of the characteristic caused by the p-error, which would in any case be present in a proportional regulator, to be proportionally smaller than the artificially produced inclination.

Circuits used to produce artificial characteristic inclinations of this type are already known in the art but involve the use of costly components. The unavoidable temperature-dependence of these components means that the characteristic inclination must be fairly considerable if a sufficiently stable working point is to be obtained.

These disadvantages may be obviated at low cost by means of the invention, according to which a respective measuring resistor is situated in the current path of each of the two regulators in order to obtain the required characteristics and the two regulators are coupled together through a further common measuring resistor in such a manner that only that part of the load current flowing from the associated regulator passes through each of the two first-mentioned measuring resistors.

Further features of the invention lie in the fact that the voltage drop across the common resistor is added directly to the voltage drop across each of the other measuring resistors and each of these sum voltages is directly compared with the reference voltage of the respective regulator, while the ratio of the resistance values of the common measuring resistor to that of the other measuring resistors is so chosen (e.g. 100:1) that when the total current is almost constant the distribution of current between the parallel-connected regulators is exactly defined.

Figure 2:
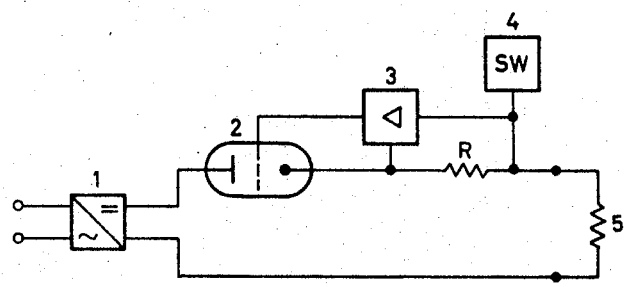
Figure 3:
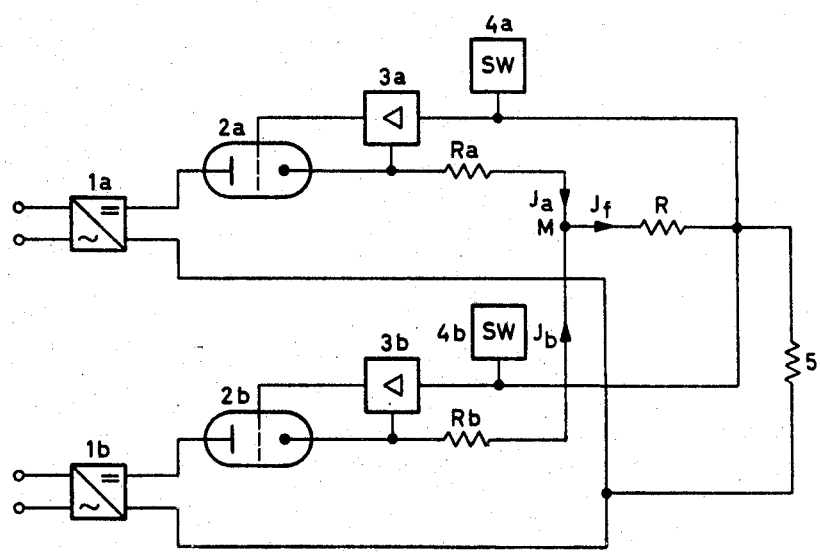

The invention will now be described with reference to FIGURES 2 and 3 of the accompanying drawing of which:

FIGURE 2 is a block diagram of a single current regulator controlling the supply of current from the shore to a submarine cable; and FIGURE 3 shows two such regulators connected in parallel in accordance with the invention.

FIGURE 2 is a block diagram of a conventional regulator controlling a supply of current from the shore. Item 1 is a point on the mains circuit at which the mains voltage is transformed, rectified and stabilized. Valve 2, which is connected in series with the load, serves as a variable resistor, by means of which the current may be maintained constant regardless of variations in mains voltage and load.

The actual value of the current is measured by means of the measuring resistor R, which is connected in series between the valve and the load, and is compared with the nominal value prescribed by the reference means 4. The difference between these two values is amplified in amplifier 3 and conveyed to the control grid of the electron tube 2 as a correcting signal, thus varying the internal resistance of the tube in such a manner as to ensure that a constant flow of direct current is manitained through the load 5.

FIGURE 3 illustrates the parallel connection of two such regulators coupled together by means of a common measuring resistor R and the resistors $Ra$ and $Rb$ required to stabilize the current distribution and produce an inclined characteristic. The partial currents $Ia$ and $Ib$ supplied by the two parallel-connected regulators A and B first pass through the measuring resistors $Ra$ and $Rb$ associated respectively with the two regulators, and are added together at the point M to give the load input current $If$. The voltage drops $Ia \times Ra$ and $Ib \times Rb$ developed by the partial currents $Ia$ and $Ib$ across the measuring resistors $Ra$ and $Rb$ through which they flow, and the voltage drop $If \times R$ across the measuring resistor R, through which the sum current flows, are totalled and directly compared with the reference voltage produced by the reference means $4a$ or $4b$ of the appropriate regulator circuit. The sum of the voltage drops across $Ra$ and R or $Rb$ and R is kept constant. If, for example, the partial current supplied by one regulator increases, the other regulator at once reduces its current so that the sum of the two currents is still kept at the value prescribed by the reference voltage of the reference means. For each variation in the partial currents there is a corresponding variation in the voltage drops across the measuring resistors $Ra$ and $Rb$. These voltage drops are added to the reference voltages determined by the reference means in such a manner that the resultant reference voltage is increased for the regulator in which the voltage drop has been reduced, and is reduced for the regulator in which it has been increased.

The current in regulator A drops to zero when regulator B has increased its current to such an extent that the current from the said regulator B produces a voltage drop across R which is exactly equal to the sum of the previous two voltage drops across $Ra$ and R since the voltage drop across $Ra$ has now been reduced to zero.

If one of the two parallel-connected regulators fails, the other has to increase its current until the sum of the two voltage drops across $Ra$ and R or $Rb$ and R is again equal to the reference voltage. However, since the full current is now passing through the measuring resistor $Ra$ or $Rb$, this remote supply current will be somewhat smaller than when the two rheostats operate in parallel, since the voltage drop across the measuring resistor $Ra$ or $Rb$ has approximately doubled.

The slopes of the characteristics of the two regulators is thus determined exclusively by resistors $Ra$ and $Rb$, this being effected in such a manner that the slopes of the characteristics increase when the partial resistors $Ra$ and $Rb$ are increased, a constant current being maintained through R. Since only one resistor with a very low temperature coefficient is now required to produce the desired characteristics, the stability of the characteristic thus produced is very great and the slopes of the characteristics may be substantially reduced so that the residual deviation from the nominal value is very slight.

We claim:

1. An electrical system for providing constant load current from a plurality of parallel-connected sources, comprising an electronic regulator for each source, each regulator having an electronic valve serving as a controllable variable resistor, a separate measuring resistor connected in series with each respective regulator and between said regulator and a common parallel connecting point for providing a first control effect, a common resistor connected between a load and said common parallel connecting point of said measuring resistors for providing a second control effect, a separate amplifier for each of said regulators having the output thereof connected for control of the valve of its respective regulator, reference means for each regulator, and circuitry controlling the operation of each of said amplifiers in response to a comparison effect of each respective reference means with the sum of its respective first control effect and said second control effect.

2. An electrical system as defined in claim 1 for stabilizing current distribution in two parallel-connected sources, wherein said first and second control effects comprise voltage drops across the respective resistors and said reference means provides a reference voltage, said resistor connections providing for direct addition of the voltage drop across said common resistor to the voltage drop across each respective two measuring resistors to provide separate summation voltages which are respectively compared with respective reference voltages provided by said reference means to control operation of the amplifiers.

3. An electrical system as set forth in claim 2, wherein the ratio of the resistance values of the common resistor and each of the measuring resistors is substantially 100:1 whereby when the total load current is effectively constant the current distribution between the two parallel-connected regulators is exactly defined.

References Cited
UNITED STATES PATENTS 3,001,082  9/1961  Clarke _____ 307—53 X
3,356,855  12/1967  Suzuki et al. _____ 307—53

ROBERT K. SCHAEFER, Primary Examiner

H. J. HOHAUSER, Assistant Examiner